UNITED STATES PATENT OFFICE.

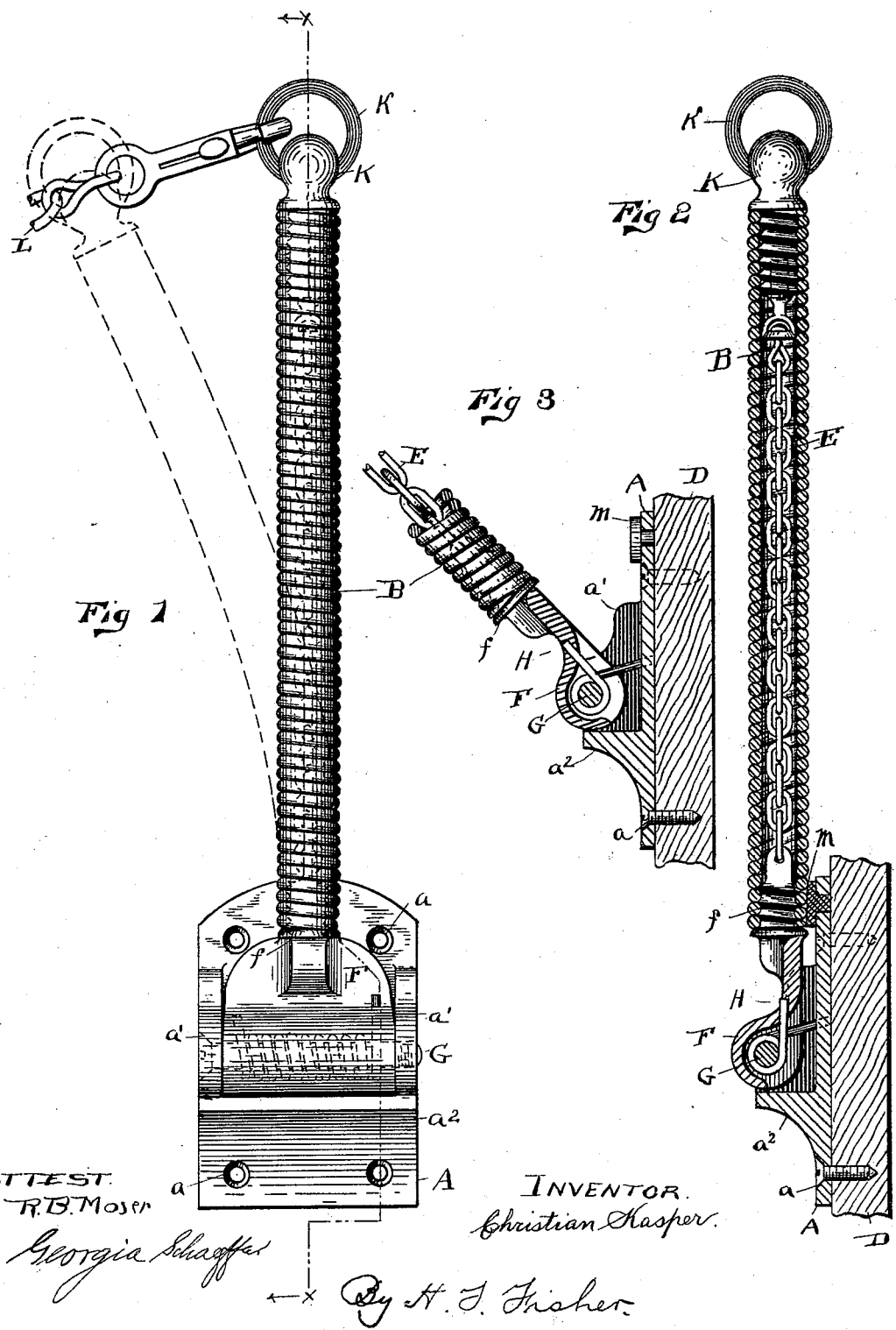

CHRISTIAN KASPER, OF CLEVELAND, OHIO.

HITCHING DEVICE FOR HORSES.

SPECIFICATION forming part of Letters Patent No. 498,351, dated May 30, 1893.

Application filed December 19, 1892. Serial No. 455,572. (No model.)

*To all whom it may concern:*

Be it known that I, CHRISTIAN KASPER, a citizen of the United States, residing at Cleveland, in the county of Cuyahoga and State of Ohio, have invented certain new and useful Improvements in Hitching Devices for Horses; and I do hereby declare that the following is a full, clear, and exact description of the invention, which will enable others skilled in the art to which it appertains to make and use the same.

My invention relates to hitching devices for horses, and the object of the invention is to provide means for hitching a horse in the stall in such a way as to provide an automatic take-up for the slack in the hitching chain or strap, so that the horse will not become entangled in the same, as he is liable to when he is hitched with a rope or chain of what would be considered a good fair length.

The invention, therefore, consists in a hitching device having a flexible standard and all constructed, combined and operating substantially as shown and described and particularly pointed out in the claims.

In the accompanying drawings, Figure 1 is a front elevation of my improved device, shown in full lines as it stands when fastened in position for use, and showing the standard slightly bent in dotted lines. Fig. 2 is a vertical central sectional elevation on line $x$, $x$, Fig. 1, and Fig. 3 is a sectional elevation of the lower part of the device with a fragment of the spring standard, and showing the same inclined upon the lower spring pressed pivoted bearing, as hereinafter more fully described.

This device, as has already been disclosed, is designed more especially for tying up horses in their stalls, but it may be used wherever found convenient and desirable. As here shown the device has a base piece or plate A, provided with countersunk holes $a$ through which it is secured in position. Upon this base and on opposite edges thereof, are the ears $a'$. These ears or flanges $a'$ are shown here as strengthened and inclosed from one to the other by the curved base $a^2$ and the base piece thus constructed is designed to be permanently and firmly fastened wherever it may be thought best in the stall.

B represents a flexible, elastic or yielding standard, formed of wire bent spirally within parallel lines and with each turn closely upon the preceding one, so that a perfectly solid surface of wound wire is disclosed to the eye. In practical use this standard or arm B is about twelve (12) inches in length, and being constructed of suitable spring wire it not only is sufficiently flexible to yield as easily as is necessary to any pulling that there may be upon the chain or strap by which the animal is fastened thereto, but still has strength enough to partly recover its upright position and stand practically erect by the side of the wall or support D, to which the device is attached. This standard or arm B furthermore not only is flexible in one direction, but by reason of its peculiar construction, is as readily bent in one direction as another, and in operation is very much like a standard that is held upon a universal joint, upon which it may be turned with equal ease in any direction. It is designed that the strength of the said standard in any direct pulling that there may be thereon, as occurs when a horse is pulling back to break his fastenings, will be practically sufficient to hold the animal of its own strength. I have, however, provided for an emergency in which the spring in itself may not be strong enough to stand the pull, by fixing a chain E therein in such way that when the standard or arm has been stretched, say, two inches or thereabout, beyond its normal length, the chain E will be drawn taut and take the further strain that may come upon the said parts. To support these several parts I have provided a hinge F, having its bearing on the screw spindle G, held in the ears $a'$ as shown, the said screw spindle having a countersunk head at one end flush with the said ears, and projecting substantially flush with the opposite ear, so as to maintain a smooth outer surface. This screw or spindle G is of sufficient strength to answer all the purposes of the device, and a spring H is wound about the said spindle and has one end bearing against the hinge and the other lodged in the base A, so that normally the said hinge F and the standard or arm B will be held in an upright position. This spring H may be made heavier or lighter, as the service may require. Projecting centrally from the said hinge portion F is a short threaded stem $f$ upon which the wire standard B is turned or screwed, and to the end of which the inner or re-inforcing chain E is attached. At the opposite end of the said flexible arm B is a threaded plug K, screwed into said standard, and having a ring $k$ for the attachment of the hitching chain L, or the usual hitching strap, if preferred. The upper end of the inner chain E is secured to the extremity of the plug K, and when the chain is in the position, as seen in either Figs. 1 or 2, the chain is slack therein, but when the spring or elastic arm B is stretched sufficiently to take up this slack, the said chain comes to the rescue of the said arm and prevents further stretching as well as the pulling out of the said arm.

In order that there may be no special noise produced by the arm B springing back into upright position, I have introduced an elastic cushion $m$ against which the said arm bears. A similar cushion might be provided at any other point where said arm may strike in going back to position, but ordinarily this is not deemed necessary.

Having thus described my invention, what I claim is—

1. A hitching device for animals consisting of an arm formed of two flexible parts, one within the other, a base, and a support for the arm having a spring pressed pivot connection with the base, substantially as set forth.

2. A hitching device for animals having a coiled wire arm of uniform cross section between its ends and a chain centrally through said arm, a connection for the hitching ring fixed to said wire and chain, and a support for the arm threaded into said wire and fixed to the chain and a base for said support constructed to be rigidly fastened, substantially as set forth.

3. A flexible hitching device having a chain through its center to limit and relieve the pull, a wire coil inclosing said chain and wound to the same diameter its entire length, a plug having a hitching ring screwed into the upper end of the coil, a plug screwed into the lower end of the coil and having a spring pressed pivoted bearing on its base, the said chain fixed to the said plugs at its ends, all said parts in combination, substantially as set forth.

4. A hitching device consisting of a chain, a closely wound wire coil about the chain and extending beyond the ends thereof, threaded plugs screwed into said coil and having the ends of the chain affixed thereto, and a spring pressed pivoted support for said parts, substantially as set forth.

5. The base piece A, the part F pivoted on said base and a spring connected with said part to support it in a vertical position, and a flexible hitching device consisting of a coiled wire and a flexible connection running through said wire and said parts fixed together upon the said pivoted part F, substantially as set forth.

6. A hitching device having a base piece by which said device is supported, a hinge part pivoted on said base, a coiled spring arm threaded on said hinge part, and a plug with a ring threaded into the upper end of said arm, substantially as described.

Witness my hand to the foregoing specification this 14th day of December, 1892.

CHRISTIAN KASPER.

Witnesses:
H. T. FISHER,
GEORGIA SCHAEFFER.